(12) United States Patent
Zahourek (10) Patent No.: US 10,219,510 B2
(45) Date of Patent: Mar. 5, 2019

(54) MOBILE SUPPORT PLATFORM FOR HUNTING DECOYS

(71) Applicant: Donald H. Zahourek, Glen Elder, KS (US)

(72) Inventor: Donald H. Zahourek, Glen Elder, KS (US)

( * ) Notice: Subject to any disclaimer, the term of this patent is extended or adjusted under 35 U.S.C. 154(b) by 296 days.

(21) Appl. No.: 15/226,846

(22) Filed: Aug. 2, 2016

(65) Prior Publication Data

US 2018/0035660 A1    Feb. 8, 2018

(51) Int. Cl.
*A01M 31/06*    (2006.01)

(52) U.S. Cl.
CPC .................. *A01M 31/06* (2013.01)

(58) Field of Classification Search
CPC ..................................... A01M 31/06
USPC ............................................. 43/2
See application file for complete search history.

(56) References Cited

U.S. PATENT DOCUMENTS

| | | | | |
|---|---|---|---|---|
| 2,962,251 A * | 11/1960 | Karpf | ............... | F16M 11/10 248/183.2 |
| 2,968,104 A * | 1/1961 | Ito | ............... | G09B 25/00 264/109 |
| 3,736,688 A * | 6/1973 | Caccamo | ............... | A01M 31/06 43/3 |
| 4,234,149 A * | 11/1980 | Kawazoe | ............... | F16M 11/10 248/184.1 |
| 4,533,103 A * | 8/1985 | Ina | ............... | F16M 11/126 248/180.1 |
| 4,965,953 A | 10/1990 | McKinney | | |
| 5,098,050 A * | 3/1992 | Bruns | ............... | A01M 31/06 248/163.1 |
| 5,128,838 A * | 7/1992 | Brandess | ............... | F21V 17/02 362/18 |
| 5,168,649 A | 12/1992 | Wright | | |
| 5,515,637 A | 5/1996 | Johnson | | |
| 5,632,110 A * | 5/1997 | Roy | ............... | A01M 31/06 43/2 |
| 5,903,997 A * | 5/1999 | Jacob | ............... | A01M 31/025 135/901 |
| 6,408,558 B1 | 6/2002 | Cornell et al. | | |
| 6,663,055 B2 * | 12/2003 | Boucher | ............... | A61G 13/12 248/118 |
| 6,708,440 B2 | 3/2004 | Summers et al. | | |
| 6,775,943 B2 | 8/2004 | Loughman | | |

(Continued)

*Primary Examiner* — Magdalena Topolski
(74) *Attorney, Agent, or Firm* — Jeffrey L. Thompson; Thompson & Thompson, P.A.

(57) ABSTRACT

A mobile support platform for hunting decoys has a support frame with a pair of runners for sliding over a ground surface. Mounting structures are provided for mounting first and second hunting decoys to the support frame. A telescoping handle is connected to an input side of a right angle drive mechanism mounted on the support frame. An output side of the drive mechanism is connected to the mounting structure for the first hunting decoy. The handle can be used to applying pushing and pulling forces to the support frame to slide the support frame over the ground surface. The handle can also be rotated about its longitudinal axis to cause the first hunting decoy to rotate about a vertical axis. The rotating movement of the first hunting decoy on the sliding support frame can be made to resemble a strutting male turkey in close proximity to a female turkey.

19 Claims, 5 Drawing Sheets

(56) References Cited

U.S. PATENT DOCUMENTS

| | | | |
|---|---|---|---|
| 6,974,228 B2* | 12/2005 | Weiser | F21S 9/035 |
| | | | 362/124 |
| 7,076,909 B2 | 7/2006 | Heinn et al. | |
| 7,895,779 B2* | 3/2011 | Schnuckle | A63H 13/02 |
| | | | 119/708 |
| 8,291,634 B2 | 10/2012 | White | |
| 2002/0100205 A1 | 8/2002 | Burton | |
| 2002/0192068 A1* | 12/2002 | Selsam | F03D 1/025 |
| | | | 415/3.1 |
| 2004/0194365 A1 | 10/2004 | Summers et al. | |
| 2006/0080884 A1* | 4/2006 | Heinn | A01M 31/06 |
| | | | 43/2 |
| 2010/0018413 A1* | 1/2010 | Thomas | A47J 37/043 |
| | | | 99/421 HV |
| 2010/0090071 A1* | 4/2010 | Gothard | B05B 13/0285 |
| | | | 248/129 |
| 2010/0175300 A1 | 7/2010 | Lau | |
| 2011/0089296 A1* | 4/2011 | Joanisse | F16M 11/14 |
| | | | 248/181.1 |
| 2011/0113672 A1 | 5/2011 | Holmberg | |
| 2012/0260840 A1* | 10/2012 | Fletcher | A01M 31/06 |
| | | | 114/264 |
| 2012/0266775 A1 | 10/2012 | Buchta | |
| 2018/0064098 A1* | 3/2018 | Davis | A01M 31/06 |

\* cited by examiner

MOBILE SUPPORT PLATFORM FOR HUNTING DECOYS

BACKGROUND OF THE INVENTION

Field of the Invention

The present invention relates generally to hunting decoys, and in particular to hunting decoy assemblies having mobile support platforms.

Description of the Prior Art

Wild turkeys are commonly hunted as game animals. Decoys are often used when hunting wild turkeys to encourage the turkeys to come within the range of a concealed hunter. Decoys are available in many types and styles, including toms, jakes and hens of a variety of configurations.

Decoy sleds have been used in the prior art to move decoys so that they appear more realistic and lifelike. For example, U.S. Pat. No. 7,076,909 and U.S. Patent Publication No. 2010/0175300 both disclose mobile decoy systems that utilize a sled with runners for sliding over the ground surface to move a decoy.

There is a need for an improved mobile hunting decoy system for attracting wary turkeys or other targeted animals into a desired area.

SUMMARY OF THE INVENTION

An object of the present invention is to provide a mobile support platform for supporting multiple hunting decoys on the same platform.

A further object of the present invention is to provide a mobile support platform that supports a hunting decoy in a manner that allows the user to rotate the hunting decoy.

A further object of the present invention is to provide a mobile support platform for hunting decoys that can be carried conveniently with one hand with the decoys attached.

A further object of the present invention is to provide a mobile support platform for hunting decoys that uses a telescoping handle to slide the support platform over the ground surface and to rotate one of the decoys.

A further object of the present invention is to provide a mobile support platform for hunting decoys that is inexpensive to make, easy to operate, has a compact configuration for storage and transport, and is effective in its intended use as a hunting decoy that resembles a strutting male turkey in close proximity to a female turkey.

To accomplish these and other objects, the present invention provides a mobile support platform for hunting decoys that has a support frame with a pair of runners for sliding over a ground surface. Mounting structures are provided for mounting first and second hunting decoys to the support frame. A telescoping handle is connected to an input side of a right angle drive mechanism mounted on the support frame. An output side of the drive mechanism is connected to the mounting structure for the first hunting decoy. The handle can be used to applying pushing and pulling forces to the support frame to slide the support frame over the ground surface. The handle can also be rotated about its longitudinal axis to cause the first hunting decoy to rotate about a vertical axis. The rotating movement of the first hunting decoy on the sliding support frame can be made to resemble a strutting male turkey in close proximity to a female turkey.

According to one aspect of the present invention, a mobile support platform for hunting decoys is provided, comprising: a support frame for moving over a ground surface; a first mounting structure for mounting a first hunting decoy to the support frame, the first mounting structure comprising a first vertical shaft with a vertical axis of rotation; and a handle having a longitudinal axis is connected to the first mounting structure. The first mounting structure comprises a drive mechanism that converts rotation of the handle about the longitudinal axis into rotation of the first vertical shaft and the first hunting decoy about the vertical axis.

According to another aspect of the present invention, a mobile decoy assembly is provided, comprising: a support frame having a pair of runners adapted to slide over a ground surface; a first hunting decoy mounted to the support frame; a second hunting decoy mounted to the support frame; and an elongate handle connected to the support frame for pushing and pulling the support frame to slide over the ground surface.

According to another aspect of the present invention, a method of using hunting decoys is provided, comprising: providing a support frame having a pair of runners adapted to slide over a ground surface, a first hunting decoy mounted to the support frame, a second hunting decoy mounted to the support frame, an elongate handle having a longitudinal axis connected to the support frame, and a drive mechanism that operably connects the elongate handle to the first hunting decoy; using the elongate handle to push or pull the support frame to slide over the ground surface; and rotating the elongate handle about its longitudinal axis to rotate the first hunting decoy relative to the support frame about a vertical axis.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

A mobile support platform 10 for hunting decoys according to the present invention will now be described in detail with reference to FIGS. 1 to 6 of the accompanying drawings.

The mobile support platform 10 includes a support frame 11 having first and second runners 12, 13 arranged to slide over a ground surface. The first and second runners 12, 13 each have upturned front end portions 14 and rear end portions 15 to facilitate forward and backward sliding movement over a rough or vegetation covered ground surface. For example, the front and rear end portions 14, 15 of the runners 12, 13 can be upturned at an angle of approximately 15 to 30 degrees from the horizontal mid portions 16 of the runners 12, 13.

The support frame 11 also has a plurality of cross members 17, 18, 19 extending laterally between the first and second runners 12, 13. A front cross member 17 extends between the front end portions 14 of the runners 12, 13, a rear cross member 18 extends between rear portions 15 of the runners 12, 13, and an intermediate cross member 19 extends between the mid portions 16 of the runners 12, 13 and is positioned between the front and rear cross members 17, 18.

First and second mounting structures 20, 21 are provided for mounting first and second hunting decoys 22, 23 to the support frame 11. The first mounting structure 20 is supported by the intermediate cross member 19 of the support frame 11 and has a first vertical shaft 24 on which the first hunting decoy 22 is mounted. The second mounting structure 21 is supported by the front cross member 17 of the support frame and has a second vertical shaft 25 on which the second hunting decoy 23 is mounted.

The first mounting structure 20 includes a right angle drive mechanism 26 mounted on the intermediate cross member 19. The drive mechanism 26 has an input side 27 and an output side 28. The output side 28 of the drive mechanism 26 includes an output shaft connected by a first quick coupler structure 29 to the first vertical shaft 24 on which the first hunting decoy 22 is mounted.

The first vertical shaft 24 of the first mounting structure 20 has an upper portion 30 connected to the first decoy 22, and a lower portion 31 coupled to the output shaft 28 of the drive mechanism 26 by the first quick coupler structure 29. The first vertical shaft 24 is mounted for rotation about a vertical axis. The first quick coupler structure 29 allows the first vertical shaft 24 and the first hunting decoy 22 to be easily attached to and removed from the support frame 11.

The second vertical shaft 25 of the second mounting structure 21 has an upper portion 32 connected to the second decoy 23, and a lower portion 33 coupled to the front cross member 17 of the support frame 11 by a second quick coupler structure 34. The second vertical shaft 25 is fixed against rotation relative to the support frame 11. The second quick coupler structure 34 allows the second vertical shaft 25 and the second hunting decoy 23 to be easily attached to and removed from the support frame 11.

A telescoping elongate handle 35 having a longitudinal axis is operably connected to a flexible torsion shaft 36 connected to an input shaft on the input side 27 of the drive mechanism 26. The handle 35 is connected to the flexible torsion shaft 36 by a quick coupling structure 37. The flexible torsion shaft 36 allows a free end 38 of the handle 35 to be moved in a limited range of side-to-side and up-and-down movement to accommodate a user's position without moving the support platform 11.

The flexible torsion shaft 36 transmits rotation movement of the handle 35 about its longitudinal axis to the input shaft 27 of the drive mechanism 26. The drive mechanism 26 converts rotation movement of the handle 35 about its longitudinal axis into rotation of the first vertical shaft 24 and the first hunting decoy 22 about a vertical axis of rotation. Thus, the first hunting decoy 22 is operably connected to the elongate handle 35 by the flexible torsion shaft 36 and the drive mechanism 26 to cause the first hunting decoy 22 to rotate relative to the support frame 11 about the vertical axis of the first vertical shaft 24 when the elongate handle 35 is rotated about its longitudinal axis.

Figure 2:
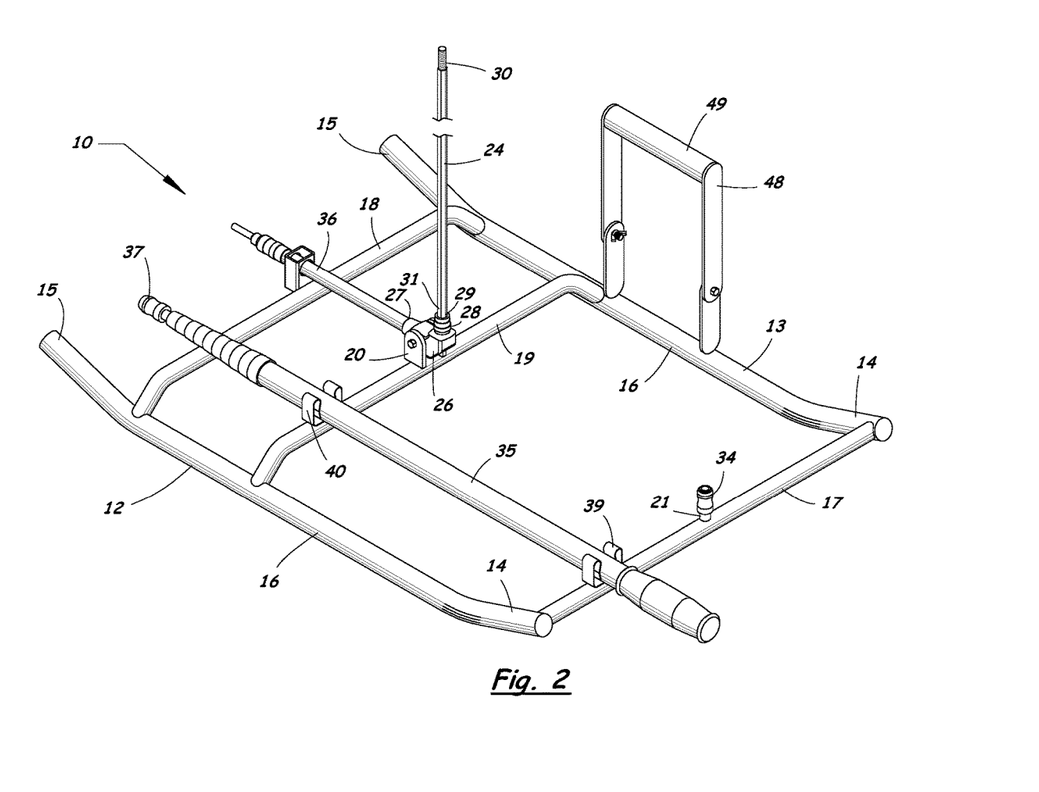
FIG. 2 is a perspective view of the mobile support platform with a carrying handle folded into a carrying position.
Figure 3:
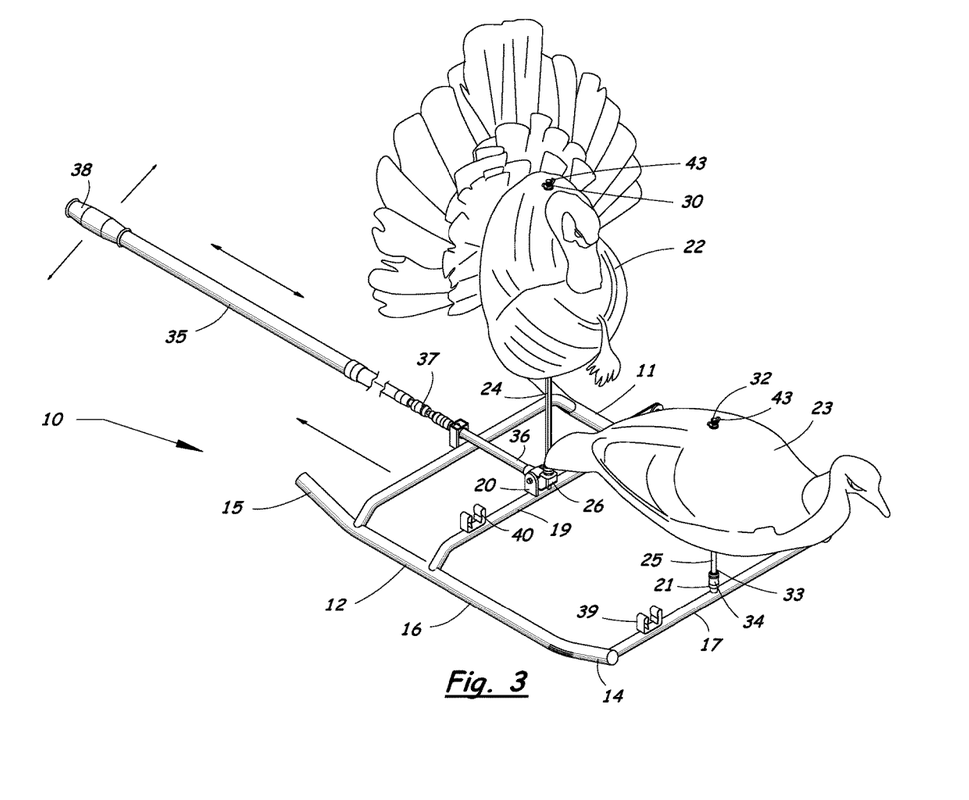
FIG. 3 is a perspective view of the mobile support platform with male and female turkey decoys supported on the platform, and a telescoping handle connected to the platform for pushing and pulling the platform and rotating the male turkey decoy.
Figure 4:
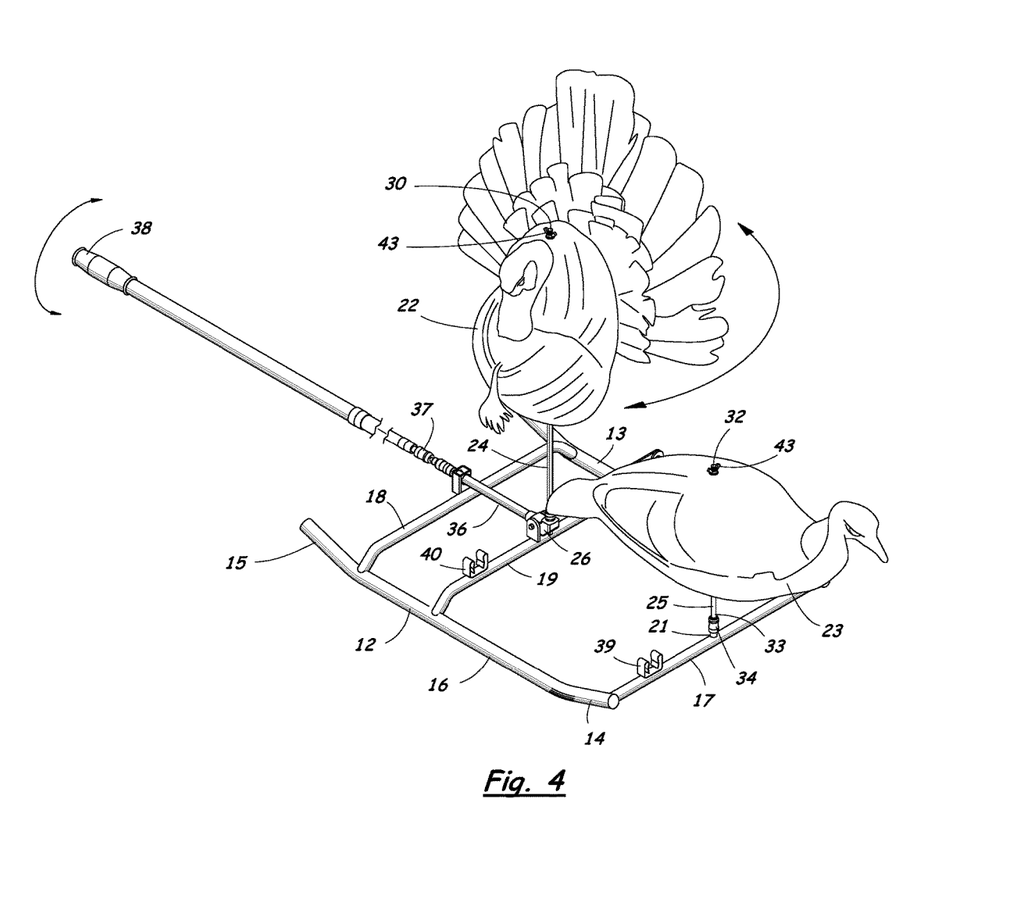
FIG. 4 is another perspective view of the mobile support platform with the male turkey decoy rotated to a different position by rotating the telescoping handle.

The handle 35 is adjustable between a short compact configuration for storage (FIGS. 1 and 2), and a long extended configuration for use in the field (FIGS. 3 and 4). The handle 35 can be gripped and rotated by a user at multiple locations anywhere along a length thereof. The handle 35 can also be used to apply pushing and pulling forces in a longitudinal direction along the longitudinal axis of the handle 35. This allows the user to extend the handle 35 to its long extended configuration and then grip and rotate the handle 35 at multiple locations while also using the handle 35 to apply pushing and pulling forces to slide the mobile support platform 10 over the ground surface.

The support frame 11 includes a pair of clips 39, 40 for attaching the handle 35 to the support frame 11 when the handle 35 is disconnected from flexible torsion shaft 36 of the first mounting structure 20 and shortened to its compact configuration for storage.

In the illustrated embodiment, the first hunting decoy 22 is a male turkey, and the second hunting decoy 23 is a female turkey. The first hunting decoy 22 is mounted to the support frame 11 behind and at a higher elevation relative to the second hunting decoy 23. This arrangement allows the decoys 22, 23 to be placed and maneuvered by the mobile support platform 10 in a manner that causes the first and second hunting decoys 22 to resemble a strutting male turkey in close proximity to a female turkey, respectively.

Figure 5:
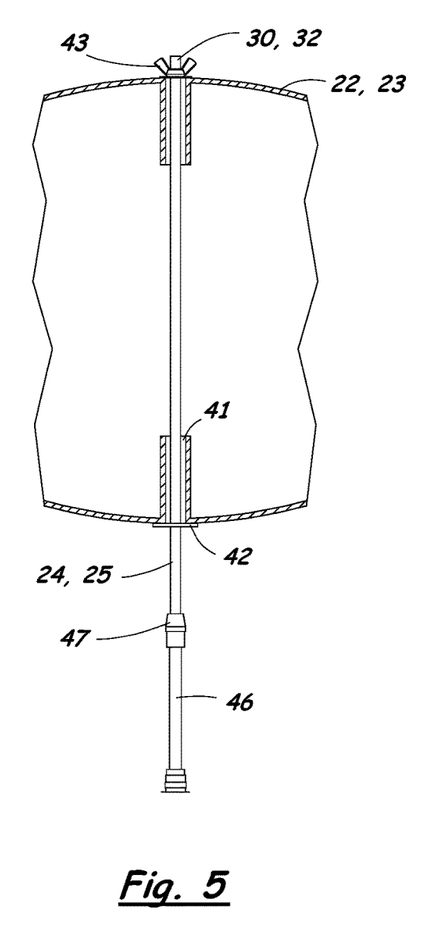
FIG. 5 is a cross section view showing the attachment of one of the decoys to a vertical shaft extending upwardly from the support platform.

The upper portions 30, 32 of the first and second vertical shafts 24, 25 are threaded. The vertical shafts 24, 25 can be connected to the first and second decoys 22, 23 by passing the vertical shafts 24, 25 through a corresponding vertical bore 41 in the decoys 22, 23, as illustrated in FIG. 5. A washer 42 can be fixed on the shaft 24, 25 to engage a lower side of the decoy 22, 23, and a wing nut 43 can be threaded onto the threaded upper portion 30, 32 of the vertical shaft 24, 25 to secure the decoy 22, 23 to the shaft 24, 25.

Figure 6:
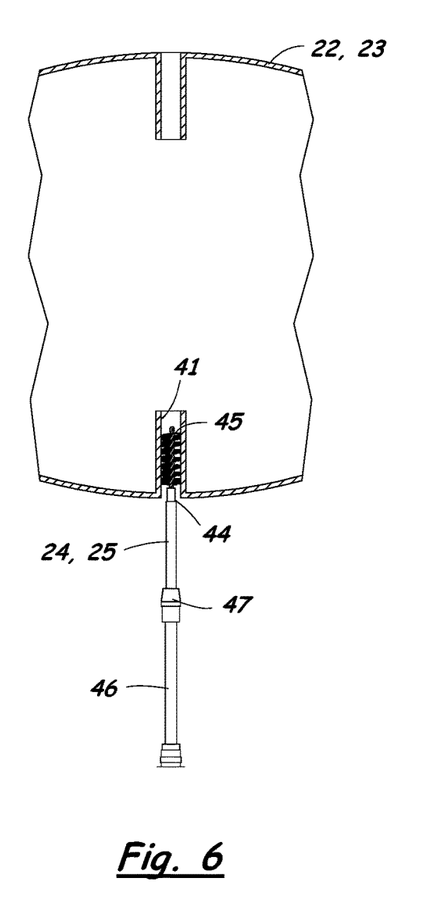
FIG. 6 is a cross section view showing an alternative attachment of one of the decoys to a vertical shaft extending upwardly from the support platform.

In an alternative embodiment illustrated in FIG. 6, the upper end of the vertical shaft 44 has a bore brush 45 attached that can be friction fit within the bore 41 of the decoy 22, 23. For example, a typical turkey decoy 22, 23 has a preformed vertical bore 41 with a diameter approximately the same as the barrel of a 20 gauge shotgun, and a metal brush 45 designed for cleaning the bore of a shotgun can be placed at the top of the vertical shaft 24, 25 and used to securely attach the decoy 22, 23 to the vertical shaft 24, 25.

Also shown in FIGS. 5 and 6 is an extension shaft 46 coupled between one of the mounting structures 20, 21 and the vertical shaft 24, 25 connected to the decoy 22, 23. The extension shaft 46 can be used, for example, to increase the height of the first decoy 22 relative to the support frame 11. The extension shaft 46 can be coupled to the output shaft on the output side 28 of the drive mechanism 26 by the first quick coupler structure 29, and to the bottom of the vertical shaft 24 by a second quick coupler 47. The quick couplers 29, 47 allow the extension shaft 46 to be removed if the user desires to have the decoy 22 positioned at a lower elevation.

A carrying handle 48 is connected to the support frame 11 to facilitate carrying the mobile support platform 10 into the field. The carrying handle 48 is foldable about a longitudinal axis between a first folded down position for storage (FIG. 1) and a second folded up position for carrying (FIG. 2). The carrying handle 48 is arranged to provide a balanced load in the second folded up position when decoys 22, 23 are attached to the mobile support platform 10, and the mobile platform 10 is rotated to a vertical carrying position. In other words, the center of gravity of the mobile support platform 10 with the decoys 22, 23 attached is approximately vertically aligned with the handgrip 49 of the carrying handle 48 in its second folded up position when the platform is rotated to a vertical carrying position (i.e., with the platform 10 rotated upwardly 90 degrees about the first runner 12).

The structure of the mobile support platform 10 for hunting decoys 22, 23 is described above. A method of using the mobile support platform 10 with hunting decoys 22, 23 will now be described.

Figure 1:
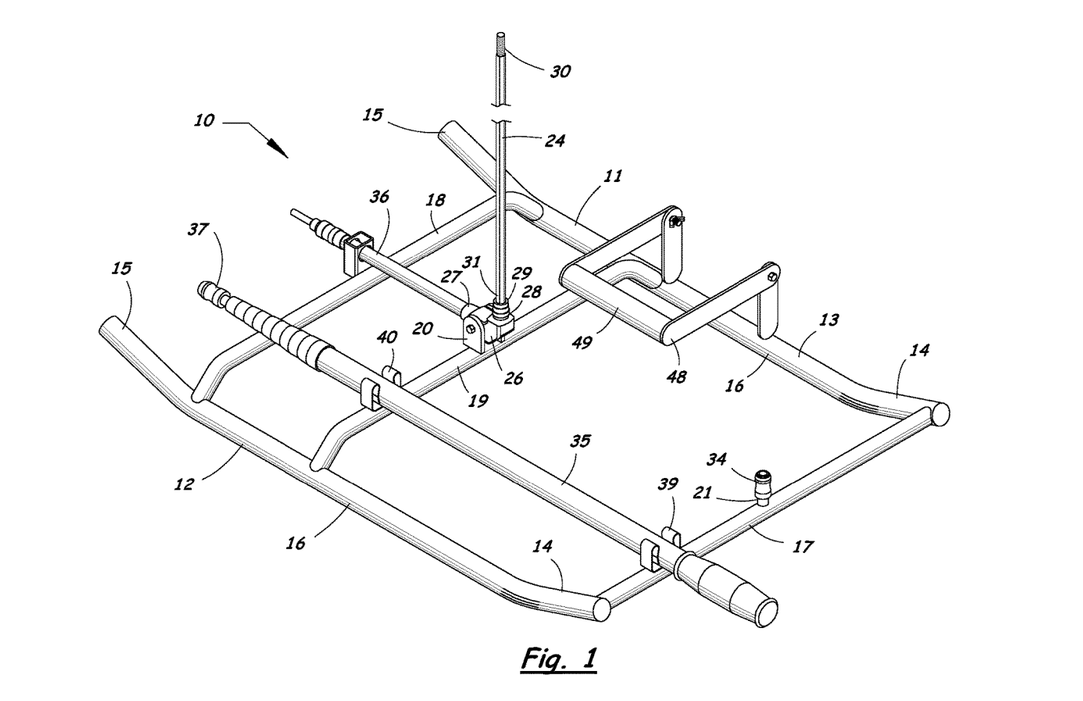
FIG. 1 is a perspective view of a mobile support platform for hunting decoys in a compact folded configuration for storage.

FIGS. 1 and 2 show the mobile support platform 10 with the telescoping handle 35 in its shortened compact configuration and attached to the spring clips 39, 40 on the support frame 11. The carrying handle 48 is shown in its folded down position in FIG. 1, and in its folded up position in FIG. 2. With the carrying handle 48 in its folded up position, as shown in FIG. 2, the mobile support platform 10 can be conveniently carried into the field with the decoys 22, 23 (not shown in FIG. 2) attached to their respective first and second vertical shafts 24, 25. This allows the entire assembly 10 with the decoys 22, 23 to be carried by one hand, thereby allowing the user to carry other items, such as a firearm, chair, or the like, with the other hand.

When the user reaches the desired hunting site, the telescoping handle 35 can be removed from the spring clips 39, 40, extended to its extended configuration, and then attached to the flexible torsion shaft 36 by the quick coupling structure 37. The handle 35 can be used to push and pull the support frame 11 to slide over the ground surface. For example, the user can remain concealed within a fence row or a grove of trees and use the handle 35 to push the mobile support platform 10 out into an open area where it is visible to a targeted wildlife species, such as wild turkeys.

While the handle 35 is being used to push and pull the mobile support platform 10 for sliding movement over the ground, the handle 35 can also be rotated about its longitudinal axis to rotate the first hunting decoy 22 relative to the support frame 11 about its vertical axis. As explained above, the rotation of the handle 35 is transmitted through the right angle drive mechanism 26 to cause rotation of the first vertical shaft 24 and the first hunting decoy 22 about a vertical axis. The user can grip the handle 35 at any position along its length to impart rotating force to the handle 35.

A combination of sliding movement of the support frame 11 over the ground surface and rotating motion of the first hunting decoy 22 about its vertical axis can be used to create the appearance of strutting male turkey in close proximity to a female turkey.

While the invention has been specifically described in connection with specific embodiments thereof, it is to be understood that this is by way of illustration and not of limitation, and the scope of the appended claims should be construed as broadly as the prior art will permit.

What is claimed is:

1. A mobile support platform for hunting decoys, comprising:

a support frame for moving over a ground surface;
   a first mounting structure with a first hunting decoy mounted to said support frame, said first mounting structure comprising a first vertical shaft with a vertical axis of rotation; and
   a handle having a longitudinal axis is connected to said first mounting structure, said first mounting structure comprising a drive mechanism that converts rotation of said handle about said longitudinal axis into rotation of said first vertical shaft and said first hunting decoy about said vertical axis.

2. The mobile support platform according to claim 1, further comprising a second mounting structure for mounting a second hunting decoy to said support frame.

3. The mobile support platform according to claim 2, wherein said first hunting decoy is a male turkey decoy, and said second hunting decoy is a female turkey decoy.

4. The mobile support platform according to claim 3, wherein said first hunting decoy is mounted to said support frame behind and at a higher elevation relative to said second hunting decoy to resemble a strutting movement of a male turkey in close proximity to a female turkey.

5. The mobile support platform according to claim 2, wherein said second mounting structure comprises a second vertical shaft having an upper portion connected to said second decoy and a lower portion coupled to said support frame by a quick coupler.

6. The mobile support platform according to claim 5, wherein said second vertical shaft is fixed against rotation relative to said support frame.

7. The mobile support platform according to claim 1, wherein said handle is a telescoping handle adjustable between a short compact configuration for storage and a long extended configuration for use.

8. The mobile support platform according to claim 7, wherein said handle can be gripped and rotated by a user at multiple locations along a length thereof to allow the user to extend the handle to its extended configuration and then grip and rotate the handle at multiple locations as the mobile support platform is moved over the ground surface by applying pushing and pulling forces in a longitudinal direction along the longitudinal axis of the handle.

9. The mobile support platform according to claim 7, wherein said support frame includes a pair of clips for attaching the handle to said support frame when said handle is disconnected from said first mounting structure and shortened to its compact configuration for storage.

10. The mobile support platform according to claim 1, wherein said support frame comprises first and second runners arranged to slide over the ground surface when longitudinal pushing and pulling forces are applied to the handle.

11. The mobile support platform according to claim 10, wherein said first and second runners each have upturned front and rear ends to facilitate forward and backward sliding movement over a rough surface.

12. The mobile support platform according to claim 11, wherein said support frame further comprises a plurality of cross members extending laterally between said first and second runners, and said cross members comprise an intermediate cross member on which said drive mechanism is mounted, a rear cross member on which a handle support is mounted for supporting said handle, and a front cross member on which a second mounting structure is supported for mounting a second hunting decoy.

13. The mobile support platform according to claim 1, wherein said drive mechanism is a right angle drive gear assembly having an input shaft connected to said handle and an output shaft connected to said first vertical shaft.

14. The mobile support platform according to claim 1, wherein said handle is connected to said drive mechanism by a flexible torsion shaft that allows a free end of the handle to be moved in a limited range of side-to-side and up-and-down movement without moving the support platform.

15. The mobile support platform according to claim 1, wherein said first vertical shaft has an upper portion connected to said first decoy and a lower portion coupled to an output shaft of said drive mechanism by a quick coupler.

16. The mobile support platform according to claim 1, further comprising a carrying handle connected to said support frame for carrying said mobile support platform into a field, said carrying handle being foldable about a longitudinal axis between a first folded down position for storage and a second folded up position for carrying, said carrying handle being arranged to provide a balanced load in the second folded up position when decoys are attached to the mobile support platform and the mobile platform is rotated to a vertical carrying position.

17. A mobile decoy assembly that includes the mobile support platform according to claim 1, the mobile decoy assembly further comprising:
    a second hunting decoy mounted to said support frame; and
    said handle comprising an elongate handle connected to said support frame for pushing and pulling said support frame to slide over the ground surface.

18. The mobile decoy assembly according to claim 17, wherein said first hunting decoy is a male turkey decoy, and said second hunting decoy is a female turkey decoy.

19. A method of using hunting decoys, comprising:
    providing the mobile support platform according to claim 1;
    providing a second hunting decoy mounted to the support frame;
    using the handle to push or pull the support frame to slide over the ground surface; and
    rotating the elongate handle about its longitudinal axis to rotate the first hunting decoy relative to the support frame about said vertical axis.

\* \* \* \* \*